United States Patent [19]

Fietz et al.

[11] 3,733,692

[45] May 22, 1973

[54] METHOD OF FABRICATING A SUPERCONDUCTING COILS

[75] Inventors: William A. Fietz, Somers, N.Y.; Donald M. Yenni, Indianapolis, Ind.

[73] Assignee: Union Carbide Corporation, New York, N.Y.

[22] Filed: Apr. 16, 1971

[21] Appl. No.: 134,756

[52] U.S. Cl...................29/599, 174/DIG. 6, 335/216

[51] Int. Cl...............................................H01v 11/00

[58] Field of Search...................29/599; 174/126 CP, 174/DIG. 6; 117/131; 335/216

[56] References Cited

UNITED STATES PATENTS

| | | | |
|---|---|---|---|
| 3,449,092 | 6/1969 | Hammond | 29/599 X |
| 3,432,783 | 3/1969 | Britton et al. | 335/216 |
| 3,205,413 | 9/1965 | Anderson | 174/DIG. 6 |
| 3,205,461 | 9/1965 | Anderson | 174/DIG. 6 |
| 3,440,585 | 4/1969 | Freeman | 335/216 |

*Primary Examiner*—Charles W. Lanham
*Assistant Examiner*—D. C. Reiley, III
*Attorney*—Eugene Lieberstein, Dominic J. Terminello and Harrie M. Humphreys

[57] ABSTRACT

A superconducting coil fabricated in a single operation from a flat strip of electrically conductive tape by roughening a clean surface of the tape and passing it under an arc plasma effluent of metallic particles to establish a direct superconductive coating thereon, superimposing a layer of insulator and winding the resulting composite tape structure into the desired inductive geometry.

8 Claims, 7 Drawing Figures

INVENTORS
WILLIAM A. FIETZ
DONALD M. YENNI
BY
ATTORNEY

INVENTORS
WILLIAM A. FIETZ
DONALD M. YENNI
BY Eugene Lieberstein

COMPARISON OF SHORT SAMPLE
CURRENTS AND DEVICE OPERATION
1/4" WIDE $Nb_3Sn$ ON
.075 cm. COPPER

INVENTORS
WILLIAM A. FIETZ
DONALD M. YENNI
BY [signature]
ATTORNEY

INVENTORS
WILLIAM A. FIETZ
DONALD M. YENNI
BY
ATTORNEY

METHOD OF FABRICATING A SUPERCONDUCTING COILS

This invention relates to superconducting coils, magnets formed from such coils and a method for manufacturing such coils. More particularly this invention relates to a superconducting coil fabricated from metallic powders and formed into the desired inductive geometry in one operation.

BACKGROUND OF THE INVENTION

Superconducting materials are categorized as solid solution alloy-type materials such as Nb—Ti and Nb—Zr and intermetallic compound compositions such as $Nb_3Sn$ and $Nb_3Al$. The critical fields of the latter type compositions are substantially above that of the former and are capable of passing a superconducting current of considerable magnitude in a field strength up to said critical field. To efficiently take advantage of the high critical fields capable of being produced by superconducting coils formed from the intermetallic compound compositions, which permit high current densities within the windings, it is essential that the coils function consistently at all times, i.e., that such coils exhibit "highly stabilized" characteristics. A "highly stabilized" coil for purposes of the present invention is defined as being capable of carrying superconducting currents up to the short sample value without degradation and should in addition be substantially unaffected by the rate at which the coil is charged. Coils which are not highly stabilized operate erratically becoming "normal," that is, the windings become resistive, when energized by current much lower than the critical current. Hence, magnets made from such coils will not provide consistent field strengths; or stated otherwise, the field strength of magnets fabricated from such coils are not reproduceable. The instability in the superconductor is due primarily to what is known in the art as "flux jumping" the effect of which is the dissipation of energy in the form of heat from that portion of the superconducting material experiencing the flux jump. In an unstable superconducting coil this heat creates a normal region which propagates throughout the superconducting device and irreversibly causes all of the superconducting material to become resistive. A highly stabilized coil prevents the normal region from propagating.

To achieve a highly stabilized condition the superconductor must be disposed in intimate contact both thermally and electrically with a normally good conducting surface such as copper and further the ratio of thickness of the normal conductor to the superconductor should be high equal to or somewhat greater than one.

Prior art methods such as vapor deposition, electroplating and diffusion coating presently in use for fabricating superconducting coils from intermetallic compound superconducting materials are limited to depositing, or forming by diffusion, extremely thin films of such material ordinarily in the range of about one micron on substrates of poor normal electrical conductivity. If a high conductivity normal material such as copper or aluminum is to be included for stability, it is added after the formation of the superconductor, possibly by soldering or electroplating, both of which operations can introduce intermediate layers of high electrical resistivity. The intermediate layer, not usually of a high field superconducting material, prevents direct intimate contact of the intermetallic compound layer with the low resistance normal conductor, which contributes to the unstable performance for superconducting coils produced by such methods.

A preferred process for depositing a superconducting layer, of any desired thickness, and of any superconducting composition, on a suitable normally conducting base for forming a superconducting article is described in U.S. Pat. No. 3,407,049. In accordance with such teaching powdered metallic material is introduced into a high velocity, high temperature gas stream to produce a high velocity stream of heated particles which are at least partially molten and directed against the surface of a suitable base to form a superconducting layer consisting of a matrix of such metallic particles bonded into interlocking relation with one another and the base material.

A method for fabricating a superconducting magnet of various geometries using the aforementioned process is described in U.S. Pat. No. 3,440,585. In one embodiment a superconducting layer is deposited upon a copper mandrel and then machined to produce a helical thread-like configuration. A non-superconducting layer is then deposited over the machined superconducting layer except for one end which will form a superconducting joint once the next superconducting layer is deposited. This is continued, alternating the superconducting joined ends, until the desired number of turns are produced for the resulting coil. The finished coil is a monolitic structure with great rigidity. However, because of the necessity for heat treating the coil it has been difficult to avoid the propagation of discontinuities and cracks inside the layer of normal conductor.

The present invention relates to an improved method of fabricating superconducting coils using the preferred coating process taught in U.S. Pat. No. 3,407,049. Not only are the problems associated with cracks in the coating eliminated but it is now possible to predetermine the performance of the superconducting coil with substantial accuracy. This is due to the fact that a superconducting coil fabricated in accordance with the present invention has been shown to be highly stabilized provided a high ratio of normal copper conductor to superconductor is maintained and the surface of the normal conductor adequately roughened before the superconductor is deposited to achieve direct intimate thermal and electrical contact between the superconducting surface and the normal conducting surface. Solenoids operating at short sample currents and giving predetermined and reproduceable magnetic field performance have been produced by the process of the present invention.

Moreover, highly stabilized coils may be fabricated in accordance with the present invention in a single continuous operation wherein each turn of the superconducting coil is physically separated from one another permitting a cryogenic fluid to be easily circulated between the windings. The present invention also includes a novel technique for combining a plurality of superconducting spiral wound coils where the junction between the coils is fully superconducting thereby forming a truly superconducting solenoid.

Another advantage of the present invention is the ease by which the thickness of superconducting layer can be controlled so that the central innermost turn in the coil which experiences the greatest magnetic field can be rendered thicker than the end turns permitting more turns to be packed into the area subjected to lower magnetic field intensities.

SUMMARY OF THE INVENTION

The method of the present invention, in which a highly stabilized superconducting coil is fabricated in a single continuous operation from a flat strip of electrically conductive tape, comprises:
cleaning one side of said tape to provide a substantially oxide free surface; roughening said cleaned surface to a surface roughness of at least 125 micro-inches RMS; passing the roughened side of said tape at a predetermined speed beneath a high velocity, high thermal content arc plasma effluent of suitable metallic particles while approximately simultaneously cooling the under side of said tape, to establish a superconductive coating of said metallic particles in direct intimate contact with said tape surface; depositing a layer of electrical insulator upon said superconducting coating to form a multilayer composite structure; and winding said multi-layer composite structure into the desired coil configuration such that each turn of the coil is physically separated from one another.

It is an object of the present invention to provide a superconducting highly stabilized coil and a method of fabricating such coil in a single continuous operation from a flat strip of electrically conductive tape.

It is another object of the present invention to provide a plurality of superconducting coils with each connected in series and in a manner such that the joint between coils is superconducting forming thereby a superconducting magnet.

Other objects and advantageous features of the invention will become apparent from the following detailed description with reference to the accompanying drawings in which:

FIG. 7 is a graph showing the relationship between copper thickness and maximum stabilization current as determined by a series of graphs of which FIG. 5 is representative.

Figures 1, 2, 3:
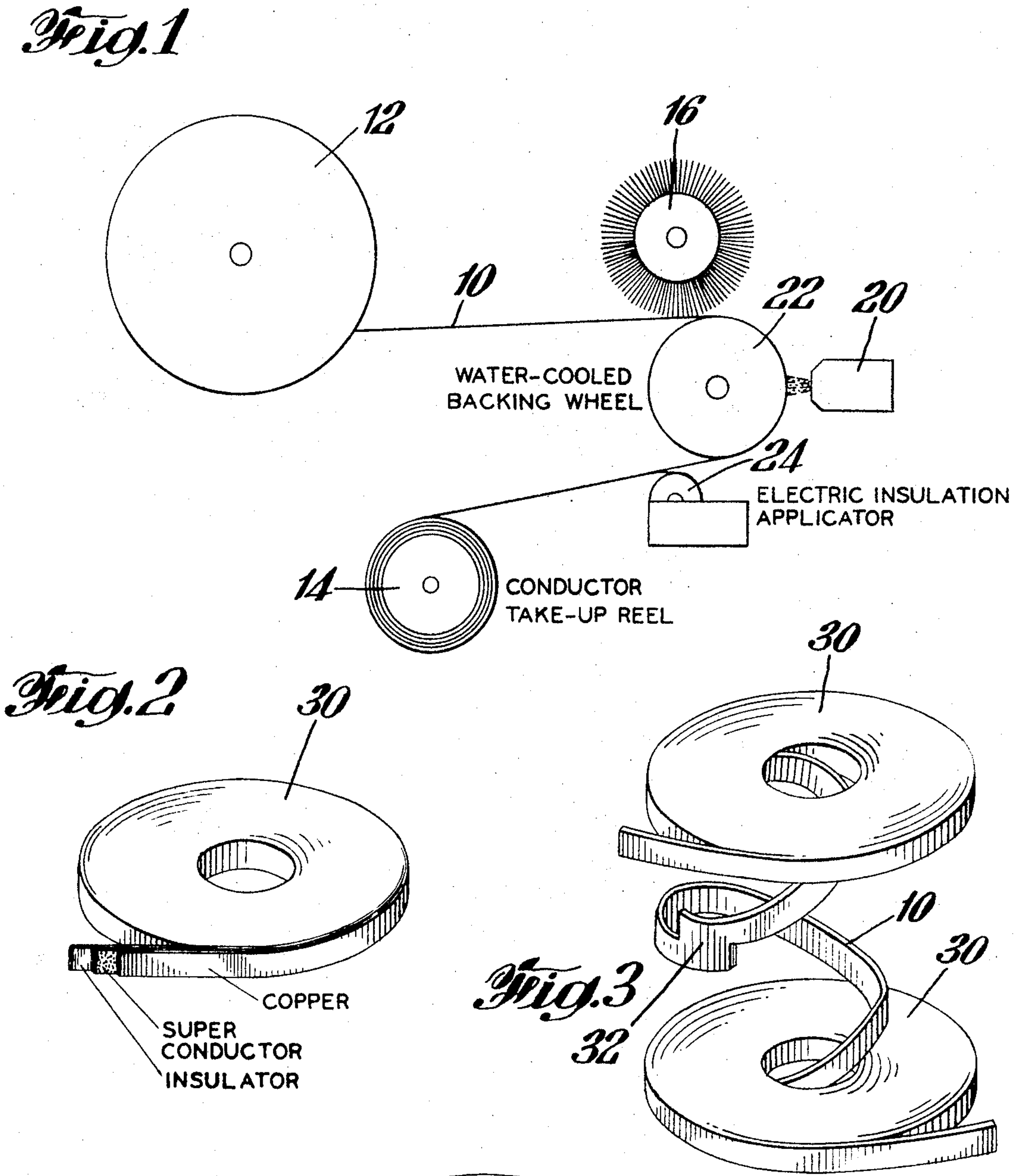
FIG. 1 is a diagrammatic illustration of the process of the present invention for fabricating a highly stabilized spiral wound coil from a continuous flat strip of electrically conductive tape.
FIG. 2 is an isometric of a single multi-layer laminate coil formed by the process illustrated in FIG. 1.
FIG. 3 is a schematic illustration of a pair of laminate coils with the inner turn of each coil joined together to form a continuous superconducting connection between the superconducting layers of each coil.

FIG. 1 illustrates the process of the invention for fabricating a spiral wound multi-layer coil from a continuous strip of electrically conductive tape. The electrically conductive tape 10 is in the form of a ribbon or flat strip and may be of any suitable electrically conductive material such as copper or aluminum. To form a superconductive coil from a continuous strip of tape in a single operation requires performing all of the necessary steps of the present invention as the tape is wound into the desired geometrical configuration for the finished coil. For a spiral wound coil geometry the process as exemplified in FIG. 1 requires simply winding the continuous strip of electrical tape upon a take-up reel 14 of appropriate diameter to give the proper dimensions to the finished coil. The tape is processed as it is being wound such that each turn will represent as hereinafter described a composite multilayer structure of normal conductor, superconductor and insulator with the superconducting layer in intimate bonded relationship to the normal conductor. The ratio of superconductor thickness to normal conductor thickness is predetermined at the outset. A conventional motorized carriage (not shown) is used to advance the tape 10 at a controlled speed from the supply reel 12 to the take-up reel 14.

The tape 10 is initially passed beneath an abrasive wheel 16 which performs two functions, simultaneously, namely cleaning and roughening. It is critically essential to the present invention that the surface of the tape to be coated with superconductor be extremely clean, i.e., that any oxides formed or present on the tape surface be substantially removed and further that the surface be roughened before coating to at least about 125 micro-inches RMS. If the tape surface is not properly cleaned and roughened the deposited superconducting material will not maintain sufficient thermal and electrical interfacial contact with the normal conductor to yield highly stabilized performance. Although an abrasive wheel 16 shown in FIG. 1 is preferred to perform the cleaning and roughening functions, any number of conventional mechanical, electrical or chemical techniques may be used to accomplish the same result, such as, for example grit blasting, the use of a wire brush assembly, electric spark or chemical etching. Moreover, the cleaning and roughening steps need not be accomplished simultaneously. Hence, the cleaning step may be carried out by passing the tape through a chemical bath and the cleaned surface thereafter roughened with sandpaper.

Immediately after cleaning and roughening the tape is passed under a high velocity, high thermal content arc plasma effluent 18 of suitable metallic particles to form the superconductive coating. The plasma effluent 18 may be produced using a conventional arc torch 20. An arc torch generally consists of two concentric electrodes across which an electric arc is established and into which a gas stream is passed. The electric arc ionizes the gas producing a very hot plasma which will emerge from the torch 20 as a high velocity, high temperature gas stream. Suitable metallic powder(s) which have superconducting properties or which once combined form an alloy or compound having superconducting properties may be passed into the high temperature gas stream. Typical superconducting materials which have been used are mixed niobium and tin powders, vanadium and silicon powders, niobium and aluminum powders, prealloyed $Nb_3Sn$, prealloyed niobium titanium, prealloyed $V_3Si$, and prealloyed $Nb_3Al$. The hot plasma melts the powder which thereafter deposits in microscopic form on the moving tape producing a coating in the form of a matrix of such metallic particles bonded in interlocking relationship to each other and to the surface of the tape. The thickness of the superconducting coating is dependent upon the relative speed of the tape as it passes beneath the arc torch 20. The thickness of the coating can be regulated simply by adjusting the speed of tape travel. Superconducting layers have been formed with a thickness ranging generally between 0.002 and 0.012 cm on a continuous strip of soft annealed stock copper tape of any predetermined thickness.

To prevent oxidation of the superconducting metallic particles after they are deposited on the surface of the tape requires cooling the tape such that the temperature of the coating is rapidly reduced to below about 200° C. This can be accomplished conventionally by applying a jet of $CO_2$ to the underside of the tape as the tape passes beneath the arc torch 20. A more desirable technique, as is shown in FIG. 1, is to pass the tape 10 around a water cooled support in the form of wheel 22 which acts as a heat sink for rapidly cooling the tape surface and deposited coating. Although shown only in block form the water cooled wheel 22 contains passageways (not shown) for receiving and recirculating a stream of water through the interior of the wheel 22 in a manner which provides the equivalent operation as that of a conventional heat exchanger. The curved surface of the water wheel 22 also functions to support the tape so that an even distribution of microscopic metallic particles can be deposited while the tape is in motion.

After the coating of superconductor is deposited on the tape surface, the tape 10 is then passed over a dispenser wheel 24 which applies a thin coating of a fast drying liquid ceramic as an insulator for electrically isolating each turn of the tape 10 as it is wound on the take-up reel 14 into the finished coil. Alternatively, an insulating layer may be superimposed upon the superconducting coating from a separate spool prior to winding the combined layers on the take-up reel 14. Insulating materials which have successfully withstood the required final heat treatment for the finished coil are silica or high temperature glass cloth tape, liquid ceramic suspensions, graphite suspensions, and high temperature enamels. A preferred liquid ceramic is one consisting of $Al_2O_3$ in a volatile binder. The insulator is not applied to the whole length of the tape but instead the ends of the tape are left with the superconducting surface exposed in order to produce superconducting joints at such ends as will be explained hereafter.

Finally the composite multi-layer structure of conductive tape, superconductor, and insulator is wound up on the take-up reel 14 of the proper size to provide a coil such as shown in FIG. 2 having an inside diameter equal to that desired for the superconducting solenoid. The superconductor is usually wound toward the inside of the coil so that it will be in compression during the bending, and so that the tape, preferably of copper or aluminum, will provide support against hoop stress during the energizing of the finished superconducting coil. Alternatively, a composite material such as copper backed with stainless steel may be used as the tape substrate. The stainless steel would provide additional strength for high field or large device applications. In such case, of course, the superconductive coating would be applied adjacent to the copper.

Figure 4:
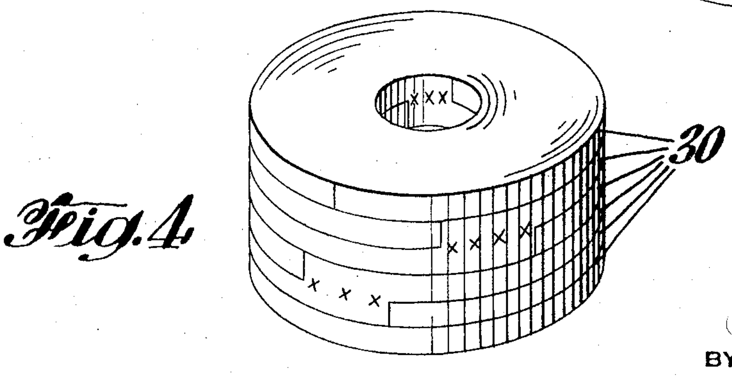
FIG. 4 is an assembly of a plurality of coils, each formed in accordance with FIG. 1, and interconnected as shown in FIG. 3 to provide superconducting joints between the coils forming thereby a superconducting solenoidal magnet.

FIG. 3 and 4 inclusive illustrates the assembly of a solenoid from a plurality of spiral wound coils. FIG. 3 shows a preferred method for joining the ends of a pair of coils 30, 30 such that continuity is maintained between the superconducting layers. The joining technique involves placing the inner turn of each coil 30 side by side with their edges abutting. They are held in this manner preferably by a jib (not shown) with the normally conductive (copper) underside exposed. The two copper surfaces are then welded along the mated edges to provide a solid welded joint 32 using as a preferred welding method the conventional TIG welding process. TIG welding consists of establishing an arc between a nonconsumable electrode usually tungsten and the material to be welded in an inert gaseous environment. Although some wetting will take place at the welded edge between the superconducting layers which lie on the opposite side of the tape it does not alone provide a reliable superconducting connection. Hence, after the edges are welded the superconducting side of the joined tapes is brought under the arc torch 20 and a further coating of superconductor deposited to firmly establish a superconducting joint. As explained earlier the insulating layer was deliberately not applied at the ends of the tape 10 in each of coils 30 to avoid having to remove the insulating coating at the ends to be joined. The joining is done between the inner turns of each coil so that the resulting connected pair will be geometrically coaxially. The formation of a good fully superconducting joint is preferred for the interior connection(s) which will be exposed to the regions of highest magnetic field. A resistive joint between coils is acceptable provided the resistance is low enough to preclude the possibility that this normal region will propagate beyond the joint. However, for persistent mode operation it would be necessary to have all the joints superconducting. Any number of coils may be joined in this manner to form a complete solenoid.

After predetermined number of coils 30 are joined the assembly is heat treated simply by inserting the assembly in a preheated furnace. The heat treatment is necessary to maximize the superconducting properties of the superconducting coating. In some instances it may not be practical to heat treat an entire solenoid. In such cases, heat treatment is done separately to pairs of coils which are thereafter joined as explained above, except that, either the additional coating of superconductor is omitted and the joint is allowed to have a small value of resistance, or a material which does not require further heat treatment to optimize its superconducting properties is sprayed over the welded region.

An investigation of the stabilization of a number of sample coils produced in accordance with the present invention was undertaken to determine the effect of stabilization as a function of the thickness of the normal conductor. The experiments were carried out with a number of 10 turn spiral wound coils of 9 cm I.D. (inside diameter) each being fabricated from single strip copper tape as discussed hereinbefore. The superconducting layers are of the intermetallic composition $Nb_3Sn$. The coils were identical except for copper thickness, which varied from 0.025 cm to 0.12 cm. A heater was wrapped around a segment of each coil about 1 cm long, so that this portion of the coil could be driven normal while a transport current was carried in the coil. The effect of stabilization was observed in the following way. A fixed value of transport current was passed through the coil. When current was applied to the heater, a voltage appeared at the terminals due to the normal region in the coil. Removal of the heater current was accompanied either by the return of the coil to its superconducting state, or by a continuing increase in terminal voltage and eventual normalcy of the coil. Whether or not the coil returned to the superconducting state was determined by the transport current in the coil and by the size of the normal region. The amount of normal material could be controlled by varying the heater current and the length of time it was applied.

Figure 5:
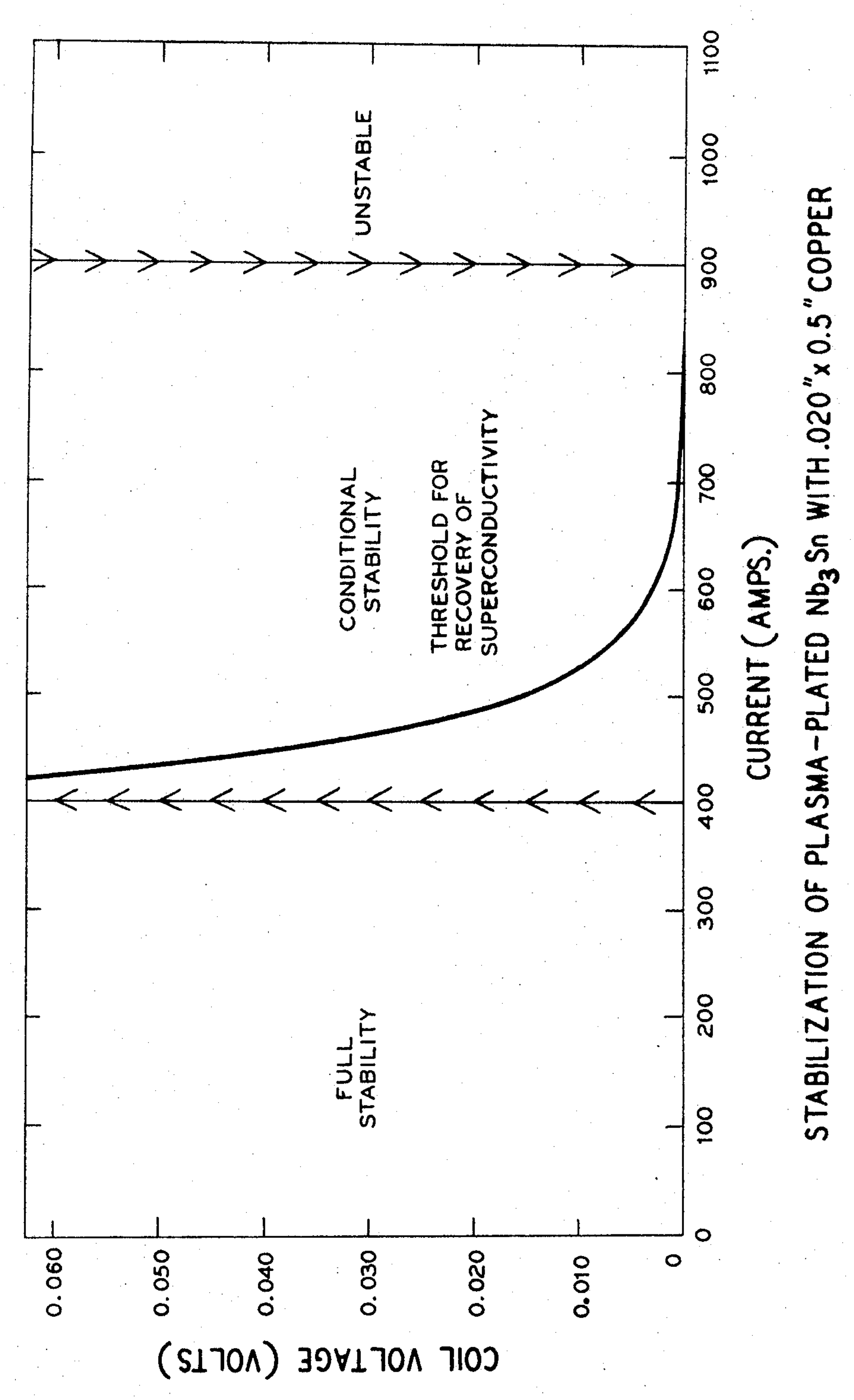
FIG. 5 is a stabilization graph for a solenoidal magnet assembled in accordance with the teaching of the present invention.

At each value of transport current, successively larger pulses were applied to the heater, until a threshold terminal voltage was found at which the coil failed to return to the superconducting state. FIG. 5 shows the results of this study for 0.05 cm thick copper. The threshold voltage curve divides the transport current range into three distinct regions. Below a transport current of 400 amperes the coil always recovered to the superconducting state when the heater pulse was removed. This is called the stable region on the curve. For transport currents greater than 900 amperes, an arbitrarily small pulse of the heater (and sometimes none at all) would drive the entire coil normal. In between these two values of current, a region of conditional stability was observed. In this region the coil would recover from small fluctuations but not from large ones. The effect of copper thickness displaced the curves horizontally.

The effect of a poor electrical bond between superconductor and substrate was investigated by two variations of the above experiment.

Coils were made which were identical to the above except for the inclusion between superconductor and substrate of a highly resistive thin layer of normal metal in one case, and an intermittent coating of an insulating material in the other.

In both cases the result was a great reduction of the upper limit of the region of conditional stability but no effect upon the lower limit.

Experience has shown that highly stable operation (i.e. short sample critical currents) can be obtained by choosing the copper thickness such that the operating current falls within the region of conditional stability. Thus, this experiment emphasizes the requirement of direct intimate bonding both thermally and electrically between the superconducting layer and the normal conductor which would otherwise substantially effect the stabilization characteristics.

Figure 6:
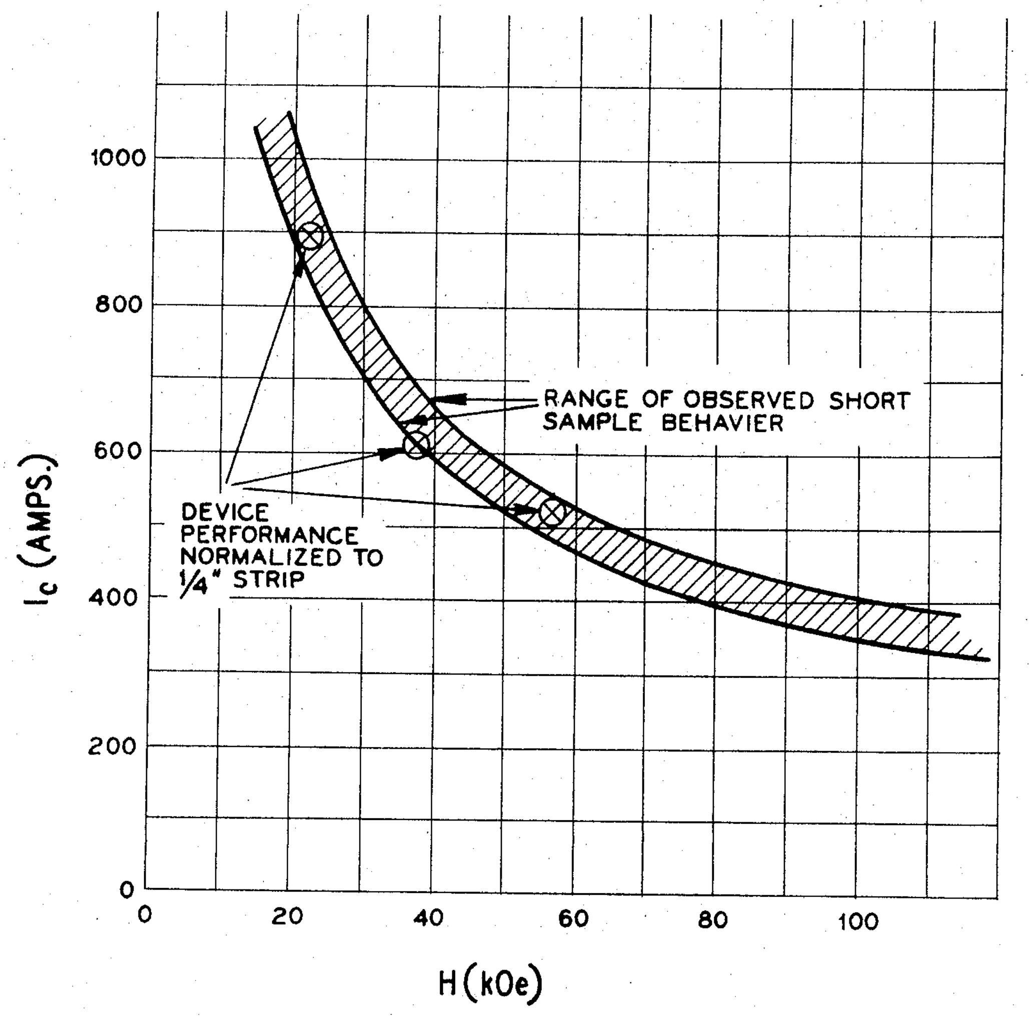
FIG. 6 is a graph showing a comparison between the critical currents of short samples of magnet conductor taken from solenoid magnets fabricated in accordance with the present invention and the maximum currents observed in such solenoid magnets.
Figure 7:
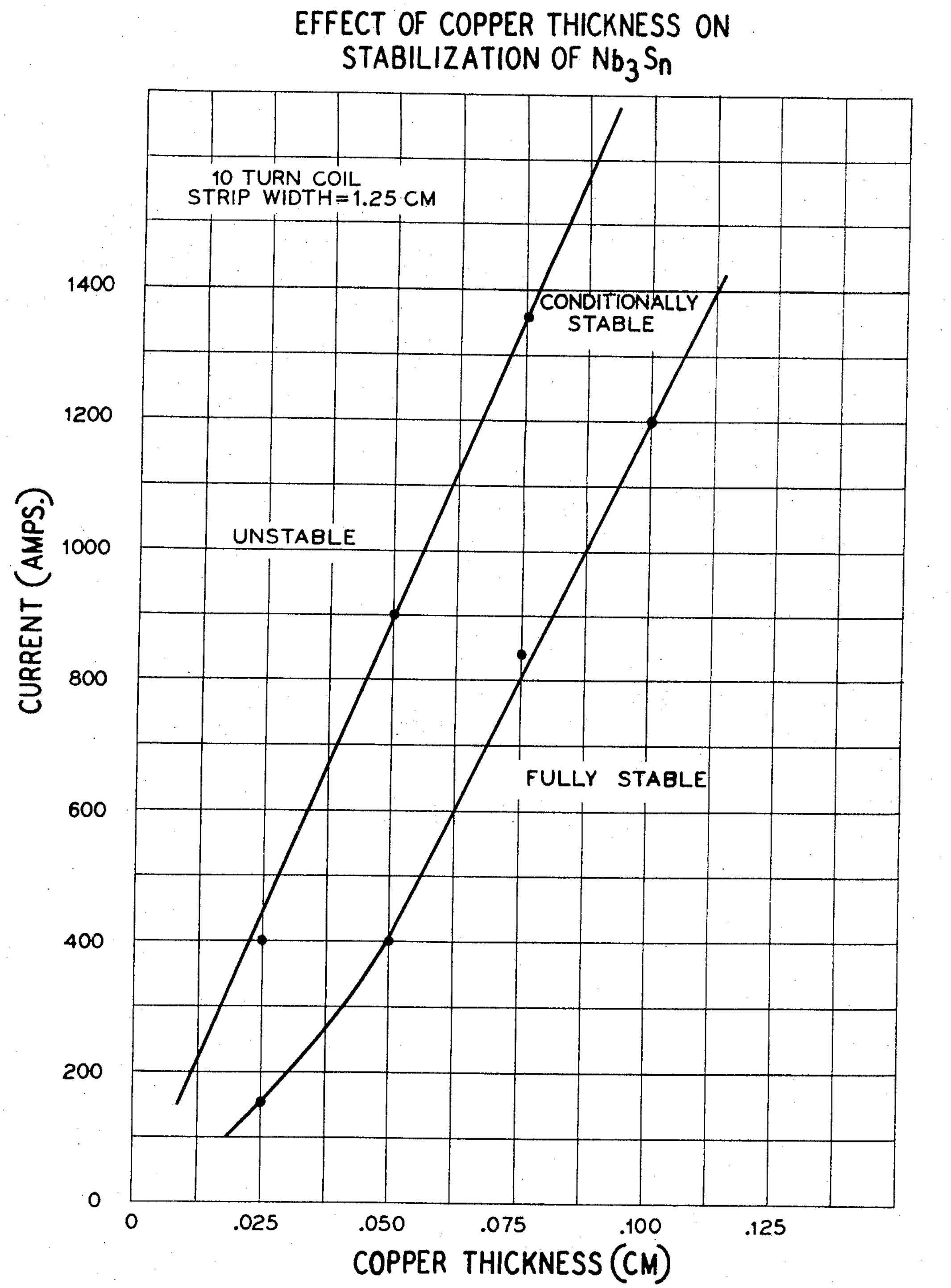

This invention provides a new type of superconducting coil whose performance in high magnetic fields is predictable to a degree not previously possible for superconducting coils formed from the intermetallic compound compositions. To design a solenoid, for example, to produce 100 kOe, one can first take the short sample critical current from FIG. 6, 400 amperes at 100 kOe. Then using another curve such as FIG. 7 the thickness of copper necessary to stabilizd 400 amperes at 100 kOe can be determined. Using this value of copper thickness and taking into account the spacing between turns and between coils, an overall current density $\lambda$ J is obtained. With this number, one can, in a conventional manner, now design the solenoid for any given appropriate geometry.

What is claimed:

1. A method of fabricating a highly stabilized superconducting coil in a single continuous operation from a flat strip of electrically conductive tape of predetermined thickness comprising:

a. cleaning one side of said tape to provide a substantially oxide free surface;
b. roughening said cleaned surface to a surface roughness of at least about 125 micro-inches RMS;
c. passing the roughened side of the tape in a normal air atmosphere at a predetermined speed beneath a high velocity, high thermal content, arc plasma effluent of suitable metallic particles to establish a superconductive coating of said metallic particles in direct intimate contact with said roughened tape surface;
d. cooling the underside of said tape approximately simultaneously with step (c);
e. imposing a layer of electrical insulator upon said superconducting coating thereby forming a multi-layer composite structure; and
f. winding the multi-layer composite structure about a mandrel to form the desired coil configuration.

2. A method as defined in claim 1 wherein the conductive tape is of a material selected from the class consisting of copper, aluminum and silver.

3. A method as defined in claim 2 wherein said conductive tape is a composite of copper superimposed on a stainless steel backing.

4. A method as defined in claim 2 wherein the superconductive metallic particles are selected from the class consisting of mixed niobium and tin powders, vanadium and silicon powders, niobium and aluminum powders, prealloyed $Nb_3Sn$, prealloyed $V_3Ga$, prealloyed $V_3Si$, prealloyed $Nb_3Al$ and prealloyed niobium titanium.

5. A method as defined in claim 4 wherein said electrical insulator is of a material selected from the class consisting of silica, liquid ceramic suspensions, graphite suspensions, high temperature enamel and high temperature glass cloth tape.

6. A method as defined in claim 4 wherein the tape is wound spirally about the mandrel to form a coil of helicoidal geometry.

7. A method as defined in claim 1 wherein said cleaning and roughening steps are carried out simultaneously by means of an abrasive wheel.

8. A method of fabricating a highly stabilized superconducting solenoid from a plurality of flat strips of electrically conductive tap comprising:

a. cleaning one side of each electrically conductive strip of tape to provide a substantially oxide free surface for each tape;
b. roughening each cleaned surface to a surface roughness of at least 125 micro-inches RMS;
c. passing the roughened side of each tape in a normal air atmosphere beneath a high velocity, high thermal content, arc plasma effluent of suitable metallic particles to establish a superconductive coating of said metallic particles in direct intimate contact with each roughened tape surface;
d. cooling the underside of each tape approximately simultaneously with step (c);
e. imposing on each superconducting surface a layer of electrical insulator thereby forming from each tape a multi-layer composite structure;

f. spirally winding each multi-layer composite structure upon a mandrel to form a plurality of coils of helicoidal geometry;

g. arranging the coils coaxially such that the inner turns of said coils and the outer turns of said coils are contiguous;

h. juxtaposing the inner turn of each coil to the inner turn of one coil located on one side thereof and the outer turn of each coil to the outer turn of one coil located on the opposite side thereof such that the inner turns so positioned and the outer turns so positioned abut at their respective edges;

i. heating the abutting inner turns and the abutting outer turns at high temperature to form a coalesed joint at the mated inner edges between abutting turns; and j. depositing a layer of superconductor on the inner and the outer turns at the welded connections to form a continuous superconducting path between adjacent coils.

* * * * *